US008146829B2

(12) United States Patent
Frost et al.

(10) Patent No.: US 8,146,829 B2

(45) Date of Patent: Apr. 3, 2012

(54) ILLUMINATED TOKEN

(75) Inventors: Raymond Timothy Frost, Annandale (AU); William Westmore Purton, Victoria (AU)

(73) Assignee: Magellan Technology Pty Limited, Annadale, New South Wales (AU)

( * ) Notice: Subject to any disclaimer, the term of this patent is extended or adjusted under 35 U.S.C. 154(b) by 678 days.

(21) Appl. No.: 11/991,228

(22) PCT Filed: Jul. 21, 2006

(86) PCT No.: PCT/AU2006/001026

§ 371 (c)(1), (2), (4) Date: Mar. 24, 2009

(87) PCT Pub. No.: WO2007/025325

PCT Pub. Date: Mar. 8, 2007

(65) Prior Publication Data

US 2009/0212116 A1 Aug. 27, 2009

(30) Foreign Application Priority Data

Aug. 30, 2005 (AU) ................................ 2005904722
Mar. 23, 2006 (AU) ................................ 2006901943

(51) Int. Cl.
*G06K 19/06* (2006.01)

(52) U.S. Cl. .......................................... 235/491; 463/16

(58) Field of Classification Search .................. 235/492, 235/491; 463/16, 25; 273/238, 309
See application file for complete search history.

(56) References Cited

U.S. PATENT DOCUMENTS

| | | | | |
|---|---|---|---|---|
| 3,983,646 | A | 10/1976 | Howard | |
| 5,166,502 | A | 11/1992 | Rendleman et al. | |
| 5,651,548 | A | 7/1997 | French et al. | |
| 5,735,742 | A | 4/1998 | French | |
| 6,005,638 | A | 12/1999 | Blair et al. | |
| 6,034,603 | A | 3/2000 | Steeves | |
| 6,061,475 | A | 5/2000 | Blair | |
| 6,294,953 | B1 | 9/2001 | Steeves | |
| 6,384,409 | B1 * | 5/2002 | Libbey et al. | 250/271 |
| 6,570,487 | B1 | 5/2003 | Steeves | |
| 6,581,747 | B1 | 6/2003 | Charlier et al. | |
| 6,659,875 | B2 | 12/2003 | Purton | |
| 6,954,859 | B1 | 10/2005 | Simerly et al. | |
| 7,005,985 | B1 | 2/2006 | Steeves | |
| 7,271,727 | B2 | 9/2007 | Steeves | |
| 7,286,158 | B1 | 10/2007 | Griebenow | |

(Continued)

FOREIGN PATENT DOCUMENTS

AU 2005906824 12/2005

(Continued)

OTHER PUBLICATIONS

Rees, Catherine, "International Search Report" for PCT/AU2006/001026, Oct. 20, 2006 (3 pages).

*Primary Examiner* — Ahshik Kim
(74) *Attorney, Agent, or Firm* — Winstead PC

(57) ABSTRACT

An identification token or label includes a light emitting device powered by and responsive to radio frequency signals to emit light in a predetermined frequency range and in a predetermined pattern. It has application as a gaming token for a casino environment or a medallion for use in monitoring patrons at sporting venues and in various parts of a supply chain.

12 Claims, 2 Drawing Sheets

U.S. PATENT DOCUMENTS

2002/0006829 A1 1/2002 Purton
2004/0219982 A1 11/2004 Khoo et al.
2006/0066444 A1 3/2006 Steeves
2006/0071756 A1 4/2006 Steeves
2006/0258442 A1* 11/2006 Ryan ............................... 463/29
2007/0159338 A1 7/2007 Beber et al.
2007/0205896 A1 9/2007 Beber et al.
2007/0285241 A1 12/2007 Griebenow et al.
2007/0293309 A1* 12/2007 Jorasch et al. .................. 463/25
2008/0042850 A1 2/2008 De Witte et al.

FOREIGN PATENT DOCUMENTS

WO WO-99/25439 5/1999

* cited by examiner

ILLUMINATED TOKEN

FIELD OF INVENTION

The present invention relates to the field of identification.

In one form, the invention relates to an improved token such as a gaming chip of the kind used in casinos or token used for entry to public venues such as sporting arenas.

In particular, the present invention is directed to a new functionality for gaming chips and tokens and for labels in the supply chain.

It will be convenient to hereinafter describe the invention in relation to a gaming token, however it should be appreciated that the present invention is not limited to that use only.

BACKGROUND ART

The discussion throughout this specification comes about due to the realisation of the inventors and/or the identification of certain prior art problems by the inventors.

In the identification of objects and articles words, pictures and numbers are used universally.

Specifically there is a need in gaming casinos and also in any application using tokens to be able to identify counterfeit tokens such as gaming chips, ensure that the chips have correctly assigned values and improve the player's enjoyment of the game.

U.S. Pat. No. 3,983,646 discloses a chip that incorporates fluorescing dyes in the rim so that when illuminated by an external light source the rims will respond by fluorescing. Different value chips can have different patterns and respond to differing wavelengths to increase the degree of discrimination between chip types and still identify counterfeit chips.

Gaming chips with transponders capable of carrying data that can be read and updated from a remote controller are known from U.S. Pat. Nos. 5,166,502, 5,651,548 and 5,735,742. The concept is to have a gaming chip that is identifiable and can be tracked as it moves around the casino. The transponder is adapted to be read and written to so that the identification data can be updated.

U.S. Pat. No. 6,616,983 discloses a metal token with light responsive dyes infused into a coating to facilitate detection of counterfeit chips in slot machine tokens.

Any discussion of documents, devices, acts or knowledge in this specification is included to explain the context of the invention. It should not be taken as an admission that any of the material forms a part of the prior art base or the common general knowledge in the relevant art in Australia or elsewhere on or before the priority date of the disclosure and claims herein.

It is an object of this invention to provide additional functionality for gaming chips and identification tokens or labels.

Another object of the present invention is to provide a more readably discernable manner of identifying articles.

A further object of the present invention is to alleviate at least one disadvantage associated with the prior art.

SUMMARY OF INVENTION

The present invention, in one aspect, provides a token which includes a light emitting device that is excited by and is responsive to radio frequency energy and/or control signals to emit light in a predetermined frequency range and in a predetermined or random pattern as may be desired.

The token may be passive or actively powered. The token may receive and/or transmit signals in association with an interrogating antenna as is known in the art. The token may optionally carry a light source which is powered actively, passively or which is initiated by external means. The token may have a light source without physical connection or inductive connection to a controlling microchip. The token may have a light source which is also connected to and controlled by an associated microchip. The microchip may be powered passively or actively. The token may be responsive to RF or any other signals. The token may be used for many applications, including gaming chip applications.

In another aspect of invention, the present invention provides a token and/or method adapted to provide identification indicia in response to an interrogation signal, comprising a light source, responsive to the interrogation signal, adapted to provide the indicia, and a body portion adapted to enable communicate the indicia external of the body portion.

In a further aspect of invention, there is provided an identification token which includes a body portion having two surfaces and a rim, an antenna located within said body portion, an electronic identification and data device connected to said antenna, a light source in communication with said electronic data device, and illumination zones connected to said light source in either of said surfaces or said rim In a still further aspect of invention, there is provided a method of identifying a token, the method comprising the steps of providing in the token, a light source responsive to an interrogation signal, and in response to the interrogation signal, communicating light emanating from the light source to an external surface of the token.

A yet further aspect of this invention provides an identification token with a data device adapted to transmit and receive data to and from the chip by radio frequency energy. The electronic chip may be adhered to under the surface of the label as disclosed in U.S. Pat. No. 6,659,875. The antenna may also be adhered to the undersurface of the label or alternatively the antenna can be printed on the undersurface of the label using appropriately conductive inks or stamped foils. The antenna may be of any suitable type. The type, in one form, may be as disclosed in Australian provisional application number 2005906824 filed 6 Dec. 2005.

Other aspects and preferred aspects are disclosed in the specification and/or defined in the appended claims, forming a part of the description of the invention.

In essence, the purpose of this invention is to convey identification, condition and/or indicia by light or other visual means such that there is a relatively instant visual indication of a characteristic or attribute of an article. The invention applies across all fields of identification including documentation, blood supply, temperature sensitive and valuable articles and boxes of contents and is not limited to these applications.

The present invention has been found to result in a number of advantages, such as:

The token can be immediately verified by visual means;

The light may be at human visible and/or machine readable wavelengths;

The token, can be read at a distance

Throughout this specification, 'token' is intended to include, without limitation, a gaming token, chip, medallion, identification device, identification device, badge, tag, ticket, playing cards, betting slip lottery ticket. The token may be applied to and/or associated with any article.

Throughout this specification, an identification device may be a transponder or may be rendered in any technology which enables identification. For example, and without limitation, the identification device may be an ASIC, chip, an ASIC with an associated antenna assembly, electronic circuitry included in a printed antenna structure, logic means or a tuned antenna.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Further disclosure, objects, advantages and aspects of the present application may be better understood by those skilled in the relevant art by reference to the following description of preferred embodiments taken in conjunction with the accompanying drawings, which are given by way of illustration only, and thus are not limitative of the present invention. It will be evident to anyone skilled in the art that this invention has application in many other embodiments. In the gaming application we show the invention incorporated inside a standard gaming or poker-chip, and in which.

DETAILED DESCRIPTION

Figure 1:
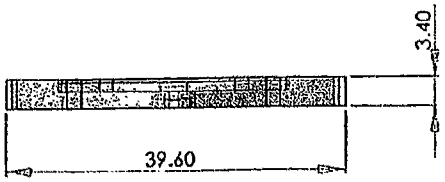
FIG. 1 illustrates an edge view of the token of this invention. The measurements are indicative only.
Figure 2:
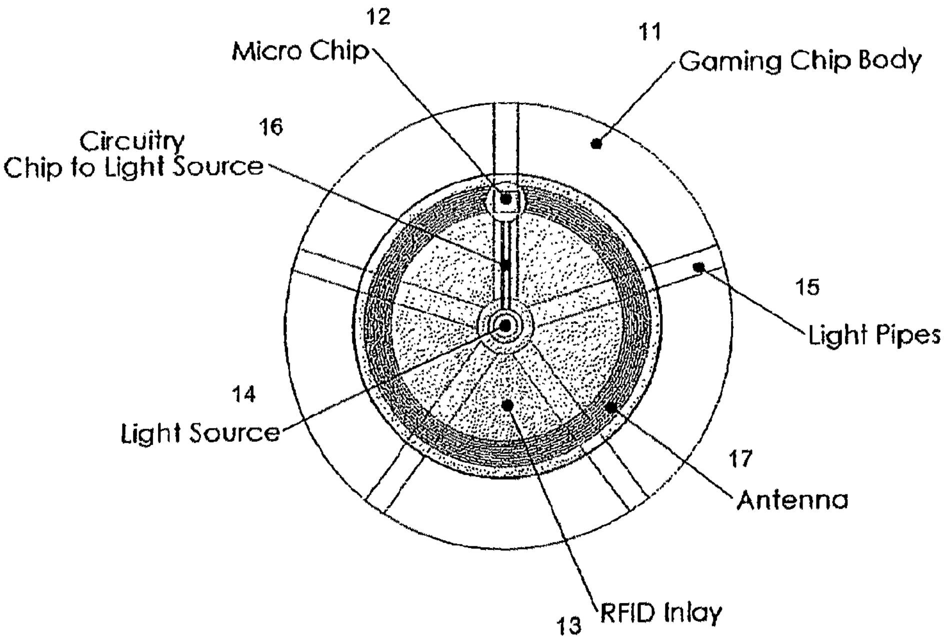
FIG. 2 illustrates a plan view of the token of FIG. 1.
Figure 3:
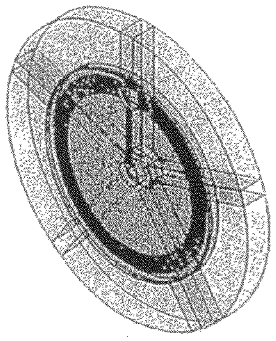
FIG. 3 illustrates a perspective view of the token of FIG. 1.
Figure 4:
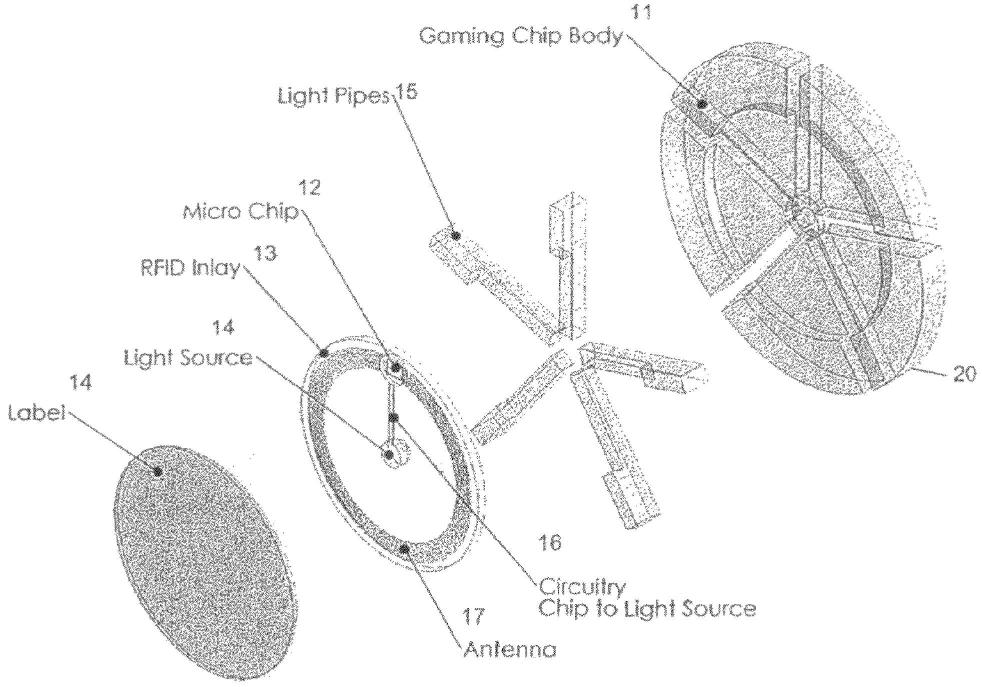
FIG. 4 illustrates an exploded view of the token of this invention.

The token shown in the drawings is a gaming chip having a disc shaped body 11 with a rim 20. The body 11 in one surface has a recessed inlay 13 for the components of the radio controlled light device which consists of an RFID microchip 12 and a light source 14 centrally located within the recess 13 and connected to the microchip 12 by the circuitry 16. The antenna 17 is also laid out in the inlay 13 and is connected to the RFID microchip 12. Optical fibres or light pipes 15 extend from the centrally located light source 14 to the rim 20 of the gaming chip. A 'light pipe' is any means of providing a communication path or medium for light of any wavelength.

The electronic chip 12 in the finished gaming token can be read from a distance of up to 20 meters. The memory block in this chip is a block of either volatile or non volatile memory which stores information in a permanent form or in an erasable form. The size of the memory and the processor will be determined by the level of information to be stored and processed by the identification device. The receiver circuitry on the microchip preferably converts received signals into digital impulses which can be deciphered by an on board processor and executes commands and instructions received and/or inserts or retrieves information stored, in the memory block.

Within a casino environment antenna and the associated control mechanism for the antenna for addressing the poker chips [readers] are placed at convenient locations to read and or transmit data to the chips. These readers may be located on or within gaming tables or on door jambs and entry points as appropriate. When a microchip 12 responds to a reader it is identified and its location may be stored and or tracked by the casino's central processing system. Part of the response can be automatic or deliberate actuation of the light source to light up for a predefined time interval and or to emit a predefined number of pulses. Where the light source is able to emit more than one frequency the microchip will also be programmed to instruct the light source to emit a specific frequency to respond to a particular command from the reader. The microchip 12 is also capable of receiving information from the reader which can reprogram the microchip's light source control programs.

Additional functionality is provided to the token not only by the incorporation of a microchip driven by an inductive antenna in the token but also by connecting a light source internally of the token and also powered by the inductive antenna such that the light source and the microchip are powered by inductive RF energy. The light source may also be controlled by the microchip inside the token. In a further implementation of the invention the light emitted by the light source is controlled by technology such as polarization technology so that the light pipes can enable various patterns and effects to be displayed. Such patterns and effects are able to, for example, show the token status, control codes, special feature codes and other visible states and conditions of the token.

This arrangement allows the identification system to operate a visual display that may be visible or in the non visible range such as infrared. The electronic device that controls the light source where it is desired to control such light source remotely may be an electronic chip also suitable to retain unique identification data with a history of transactions and a history or audit trail. It may be of the type disclosed in U.S. Pat. No. 5,651,548 which is readable at locations within a casino and capable of sending and receiving data. Usually an antenna will also be needed and this antenna is attached to or may also be part of the electronic chip. The tokens preferably incorporate an RFID chip, an antenna and an electronics module and processor to receive the radio frequency signals and control the light source. The light source may be an LED light source, a biological light source or a fluorescing light source powered or initiated by the absorption of a particular radio frequency. The token is preferably powered by the radio frequency energy to operate the RFID chip and illuminate the light source. More than one frequency of light source may be used and preferably the light source is visible from the rim of the token so that it can be seen when the tokens are stacked. Fibre optics or light pipes may be used to conduct the light from the light source to locations on the surfaces of the rim of the token.

A casino can use the information derived from the location of the chip for some or all of the following:

Security—to detect forgeries by continuously interrogating chips that are in play by commanding them to emit lights so that unlit tokens can be removed as counterfeits.

Authentication—by allowing a casino to switch colour codes at will and thereby defeat counterfeit tags which do not display the correct authentication or recognition signal.

Player rewards—by illuminating "lucky" tokens as another source of prizes.

Improved game enjoyment.

Designate chip value by having all chips or a designated value emit the same coloured light or light pattern.

The identification token can also be used to identify persons and or objects or articles in a supply chain if it is formed as a medallion or brooch that can be attached to a person, object or article in a supply chain.

The token is also of particular use in sporting and other entertainment venues where it can be used to more rapidly authenticate and allow the passage of persons whose authorised token or ticket displays the correct light or light patterns.

Identify the date and place of issue and/or the date and place of the event so that only authorised tokens will be illuminated or vice versa.

Identify the seat location allocated to the wearer.

Identify the wearer.

Indicate that the token is in an allocated area.

The token is also of particular use in a supply chain where light or light patterns may also be emitted by the tokens in order to improve identification and authentication.

In the supply of blood—labels with flashing or red lights may indicate contaminated or out of date samples.

In the control of government or medical documents labels fixed on Top Secret or highly sensitive documents can be made to flash with a unique colour thereby alerting all persons within a visual range that such documents are present.

In the supply of food when the light source can also be coupled optionally to a temperature sensitive device and where, if a pre determined temperature range is breached in any way, the package of food will flash accordingly.

From the above it can be seen that the present invention provides a new and unique token that has application to gaming, access control, medical, document control, supply chain and many other applications.

The present invention may also include a number of alternatives, such as, without limitation:

the token and/or system may be coupled with any other light-emitting source, whether an LED or other lighting device/component, which would give a visible signal, and which may be detected with the naked eye and/or machine readable the token may have a LED or some 'chemical' coating which when 'radiated' with RF, provides some 'visual' or 'displayable, for example an electroluminescent screen or coating.

The electroluminescent coating may replace or be additional to the RFID chip as disclosed hereinbefore.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

"Comprises/comprising" when used in this specification is taken to specify the presence of stated features, integers, steps or components but does not preclude the presence or addition of one or more other features, integers, steps, components or groups thereof." Thus, unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

The claims defining the invention are as follows:

1. A token adapted to provide identification indicia in response to an interrogation signal, the token comprising:

a light source adapted to provide the indicia responsive to the interrogation signal;

a body portion adapted to communicate the indicia external of the body portion; and light pipes adapted to communicate the indicia from the light source.

2. The token as claimed in claim 1, wherein the indicia is communicated to an external surface of the token.

3. The token as claimed in claim 1, further comprising a chip operatively associated with the light source.

4. The token as claimed in claim 3, wherein the chip is responsive to radio-frequency (RF) signals.

5. The token as claimed in claim 1, wherein the interrogation signal is a radio-frequency (RF) signal.

6. The token as claimed in claim 1, wherein the token comprises a gaming token.

7. The token as claimed in claim 1, wherein the indicia provides at least one of identification, characteristic and/or attribute information regarding the token.

8. An identification token comprising:

a) a body portion having two surfaces and a rim;

b) an antenna located within said body portion;

c) an electronic identification and data device connected to said antenna;

d) a light source in communication with said electronic identification and data device;

e) illumination zones connected to said light source in either of said surfaces or said rim; and f) light pipes adapted to communicate indicia from the light source.

9. A token comprising:

a light emitting device adapted to emit light in a predetermined frequency range and/or in a predetermined pattern;

wherein the light emitting device emits the light responsive to radio-frequency (RF) signals; and wherein the light is communicated via light pipes.

10. A method of identifying a token, the method comprising the steps of:

providing in the token, a light source responsive to an interrogation signal;

communicating, in response to the interrogation signal, light emanating from the light source to an external surface of the token; and wherein the light is communicated via light pipes.

11. An identification system comprising:

an interrogator; and a token, the token comprising:

a light source adapted to provide an identification indicia responsive to an interrogation signal from the interrogator; and a body portion adapted to communicate the identification indicia external of the body portion; and light pipes adapted to communicate the identification indicia from the light source.

12. The system as claimed in claim 11, wherein the interrogator provides radio-frequency (RF) signals.

* * * * *